March 7, 1939.  K. R. HERMAN ET AL  2,150,032

MACHINE TOOL SPEED CONTROL

Filed Oct. 18, 1937  5 Sheets-Sheet 1

INVENTORS
Kenneth R. Herman
Harry F. Vickers
BY
Barnes, Kisselle, Laughlin & Raisch
ATTORNEYS

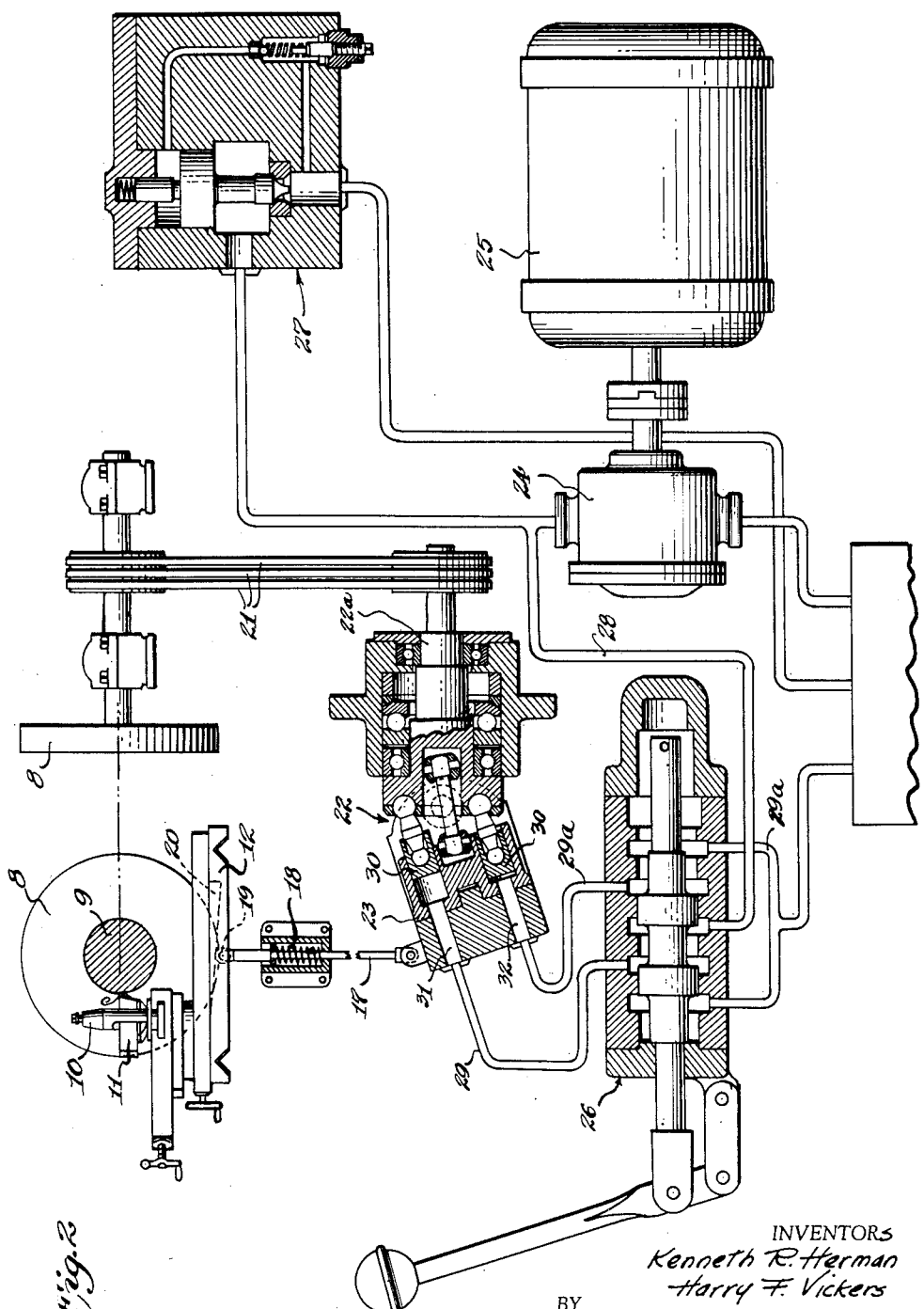

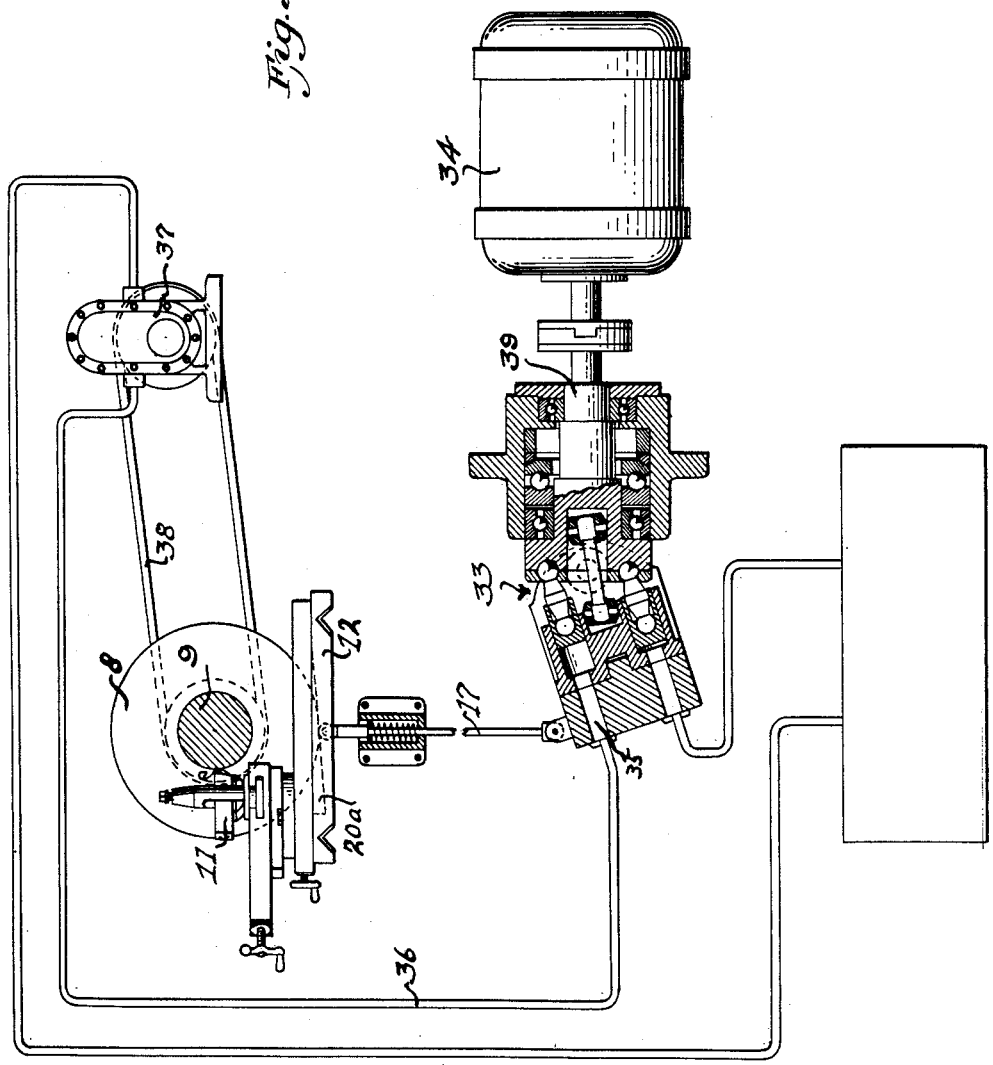

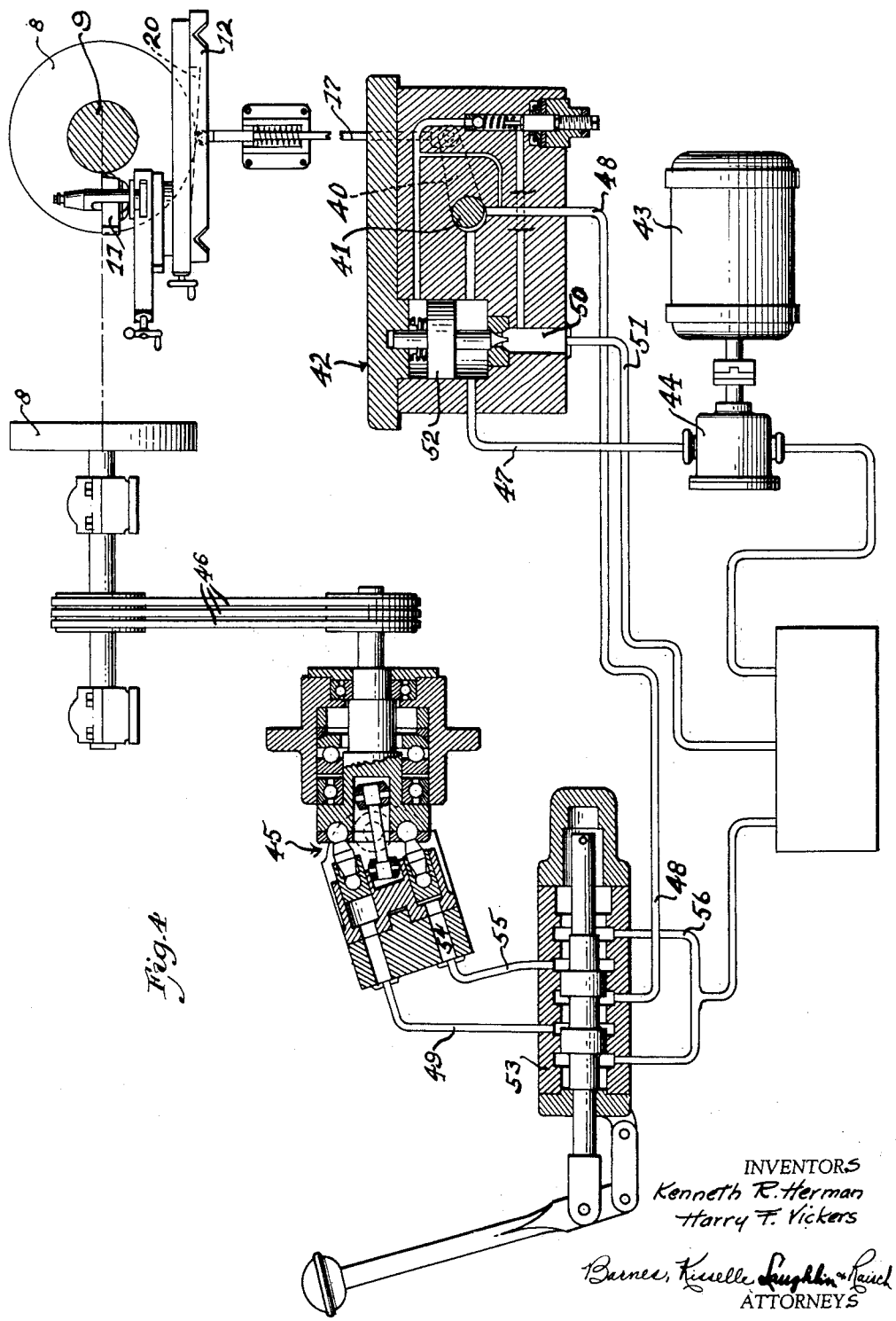

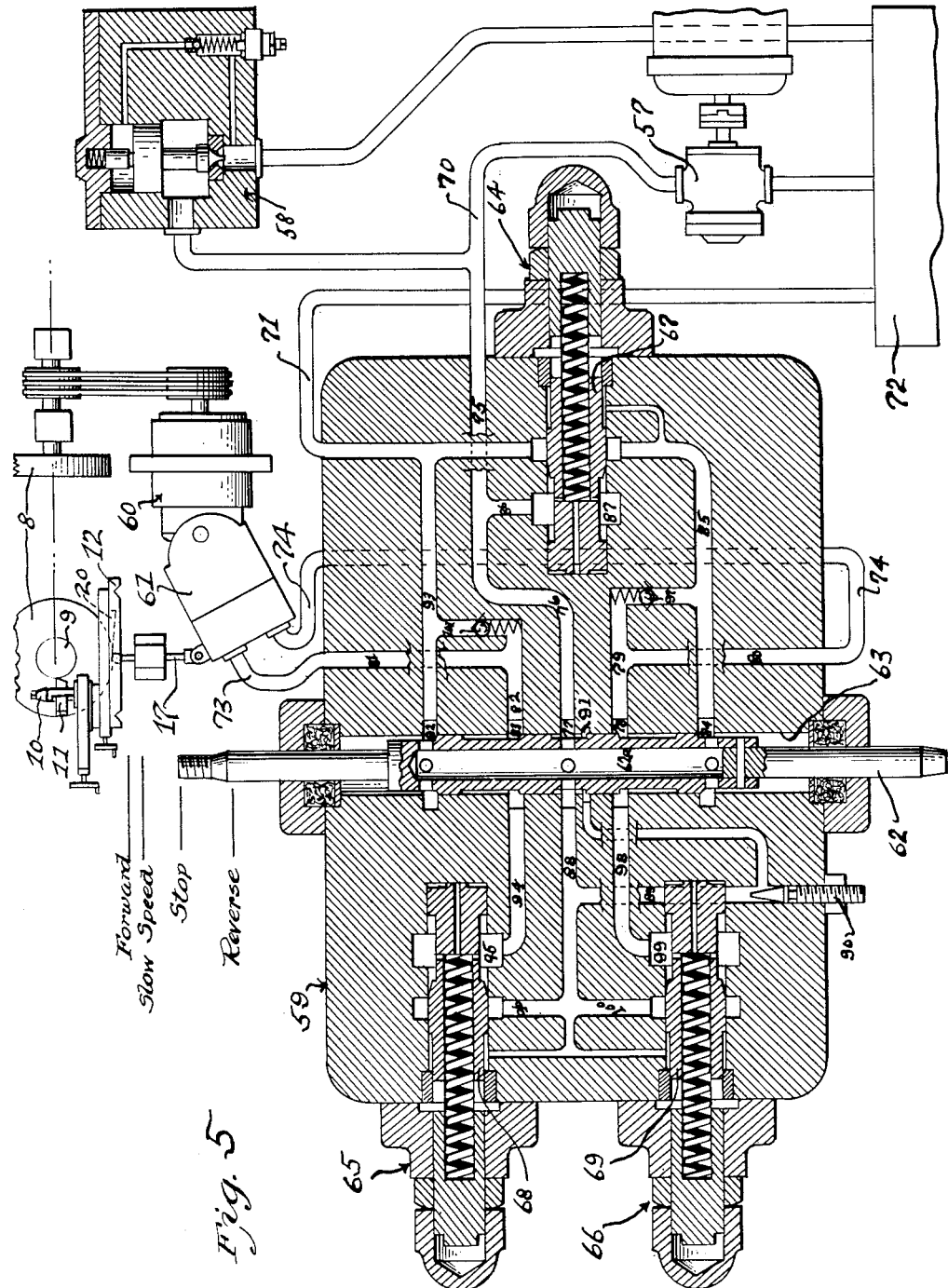

Patented Mar. 7, 1939

2,150,032

UNITED STATES PATENT OFFICE 2,150,032

MACHINE TOOL SPEED CONTROL

Kenneth R. Herman and Harry F. Vickers, Detroit, Mich., assignors to Vickers, Incorporated, Detroit, Mich., a corporation of Michigan Application October 18, 1937, Serial No. 169,626

10 Claims. (Cl. 82—21)

This invention relates to machine tool speed control. The objects of the invention have particularly to do with means for controlling the acceleration and deceleration of a machine and for maintaining a definite speed relationship between the work and the cutting tool of the machine.

An object of the invention is to provide a variable speed control means for work or material being cut or ground on a machine tool such that, as the dimensions of the work are changed due to the cutting or grinding, the speed will also be changed to maintain a constant speed relationship between the cutting device and the work. The invention is especially adapted for use with lathes or grinders where the diameter of the work at the point of contact with the tool decreases or increases with the progress of the cutting.

Machines of this type require a constant power output at the spindle which is used to drive the work and, in other words, the torque requirements of such a drive vary inversely with the speed of the work. With the use of highspeed cutting tools, and in modern highspeed production it is desirable that the cutting speed be maintained as high as possible during the entire cut, and for any specific material, the most efficient rate of stock removal for maximum tool life is at a constant surface or lineal speed and a predetermined feed. In many cases the saving in time due to the maintenance of a constant cutting speed is quite considerable. Furthermore, a constant cutting speed produces a smoother cut. Previous practice has been to utilize multi-speed gear boxes and clutches which provide a series of speeds in steps, and which require the selection of a speed which most closely approaches the ideal speed for the work being done. With the present invention, a hydraulic mechanism makes possible a stepless feed variation, and by installing a suitable tachometer on the spindle, or using graduations on the control dial which regulates the hydraulic mechanism, it is possible to obtain automatically an ideal constant cutting speed for any condition within the limits of the machine. Furthermore, it is unnecessary to have continual attention by a workman in order that the cutting speed be maintained at a constant rate.

Another object of the invention is to provide a control means for a hydraulically actuated machine tool which automatically governs the acceleration and deceleration pressures of the machine independently of the general limiting pressures of the system. To start the spindle on a geared head lathe, it is necessary to engage a mechanical friction clutch, and to stop, it is necessary to disengage the clutch and apply a friction brake. The hydraulic control means contemplated by the present invention starts the spindle by the shift of a control valve and allows the slip of the system to be taken up by a relief valve which limits the pressure available for acceleration. Stopping is also accomplised by a shift of the control valve which relieves the pump of all pressure and which at the same time, directs exhaust oil from the motor to a relief valve which serves as a brake. Thus mechanical wear is eliminated and quiet operation is assured. Furthermore, the spindle speed may be varied without stopping the spindle as is usually necessary in the geared head designs.

The automatic constant speed is obtained by providing a variable speed power source on a machine tool, as for example, a lathe, and operatively connecting it with the tool carriage in such manner that movement of the tool carriage away from or toward the center of the work will increase or decrease the speed of the power source and, in turn, increase or decrease the speed of the work, thereby maintaining a constant cutting speed at the point of contact of the tool with the work. The acceleration-deceleration control means is used in combination with the above.

Several modifications of the invention are illustrated in connection with a machine tool in the following detailed description. It will be understood that the invention is not intended to be limited to use with a machine of any particular type.

In the drawings:

Fig. 2 illustrates a lathe driven by a variable displacement hydraulic motor which has a movable head operatively connected to the tool carriage.

Fig. 3 represents a lathe driven by a hydraulic motor which is supplied with pressure fluid from a variable displacement pump, the movable head of which is operatively connected to the tool carriage of the lathe.

Fig. 4 illustrates a variable throttle drive in which a constant flow throttle valve is interposed between a constant displacement pump and a hydraulic lathe motor, said throttle valve being operatively connected to the tool carriage of the lathe.

Fig. 5 illustrates a control means for independently regulating the limiting pressures during acceleration and deceleration periods of the machine tool.

Figure 1:
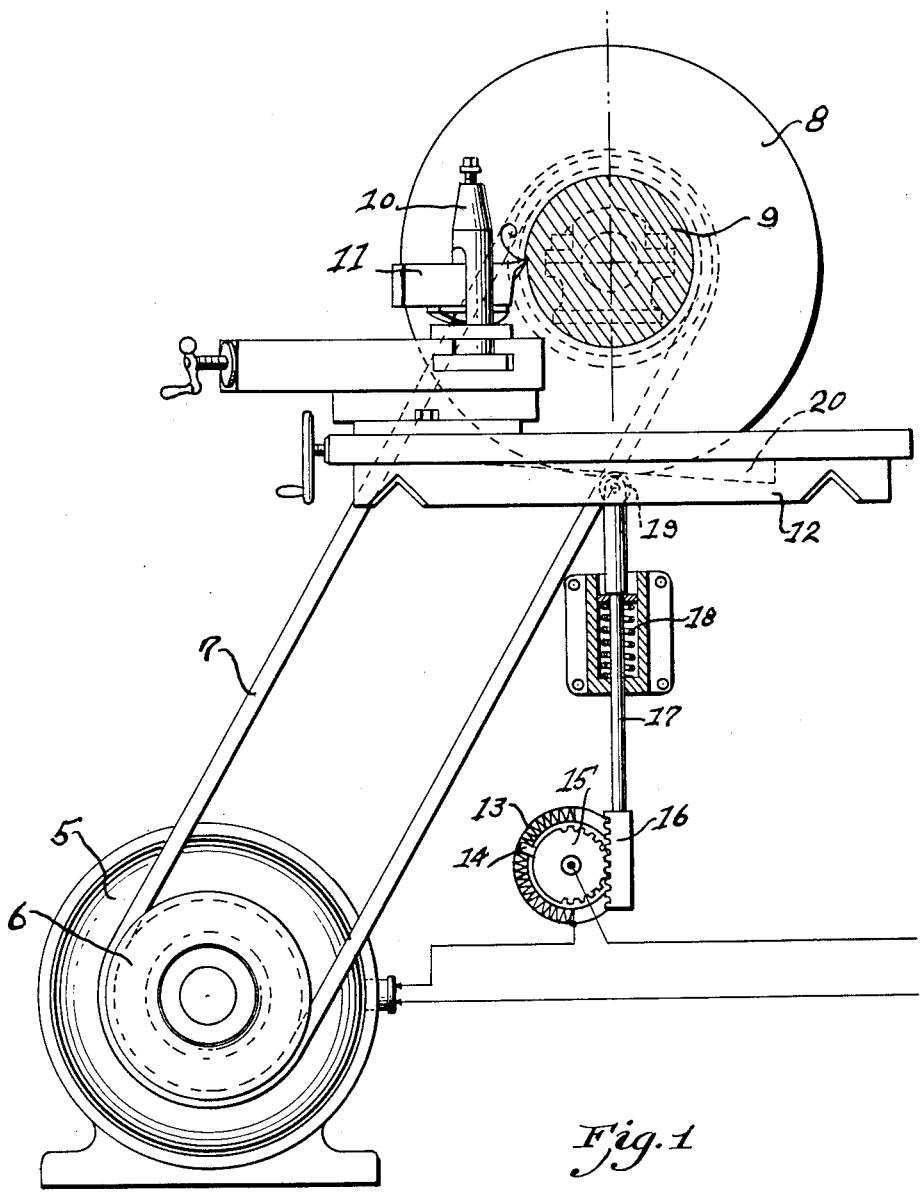
Fig. 1 represents a lathe driven by an electric motor which is connected to an electric power system through a rheostat which, in turn, is operatively connected to the tool carriage of the lathe.

Referring to Fig. 1, a motor 5 having a pulley 6 is connected by belt 7 to a spindle chuck 8 which holds and drives an article to be machined, designated at 9. A tool post 10 containing a tool 11 is mounted on a cross-feed carriage 12. In the power line leading to the motor 5 is a rheostat 13 having a movable arm 14 on a pinion 15. The pinion 15 engages a rack 16 which is connected to a plunger 17, the plunger being urged upwardly by a spring 18. The top portion of the plunger is provided with a roller 19 adapted to engage a cam 20 on the carriage 12.

In the operation, as the tool 11 reduces the diameter of the work article 9, the cross-feed carriage 12 will be moved to the right as viewed in Fig. 1. The plunger 17 will rise gradually as the cam member 20 moves with the carriage 12. The rack 16, moving with the plunger 17, will automatically adjust the movable arm 14 of the rheostat and gradually increase the speed of the motor 5. The cam 20 and the rheostat 13 are designed such that the speed of the motor is synchronized with the movement of the cam and the cutting speed of the tool 11, at the point where it contacts the work 9, will be maintained constant regardless of the change in the dimensions of the work.

In the embodiment shown in Fig. 2 the chuck 8 is driven by belts 21 running from a variable displacement hydraulic motor 22. The variable speed motor, of the well known variable piston displacement type is provided with a swivel yoke 23 universally joined to the drive shaft of the motor. The motor 22 is furnished with liquid under pressure by a constant delivery pump 24 driven by a motor 25. A control valve 26 and overload relief valve 27 are provided in the circuit to control the direction and maximum pressure of the working fluid which reaches the pump 22 through the pipes 28 and 29. Pipes 29a serve as the exhaust lines to the tank. The speed of the hydraulic motor 22 is varied by changing the displacement of pistons 30, the speed increasing with a decrease in displacement. The displacement is decreased by decreasing the angle between the axis of the cylinders in which the pistons 30 reciprocate and the axis of rotation of the driving shaft 22a. The swivel yoke 23 of the variable displacement motor is pivotally connected to the plunger 17, which as described with reference to Fig. 1, contacts the cam 20 on the carriage 12.

In the operation, when the electric motor 25 is started, the pump 24 delivers oil under pressure through the control valve 26 and lines 28 and 29 to the motor 22. With the control valve as shown in Fig. 2, the oil under pressure enters the motor 22 through the port 31 and is exhausted from the motor through a port 32 leading to the exhaust pipes 29a. The motor 22 will drive the spindle 8 and the work 9 through the belts 21 at a speed determined by the angular displacement of the swivel yoke 23. As the carriage 12 is fed in, and the tool 11 works on a smaller diameter, the cam 20 mounted on the carriage 12 allows the plunger 17 to rise, thereby decreasing the angle between the axis of the cylinders and the axis of rotation of the driving shaft 22a. The speed of the motor therefore increases by an amount sufficient to maintain a constant cutting speed between the tool 11 and the work 9. It will be seen that as the cutting tool works on a continuously decreasing diameter, the displacement of the hydraulic motor 22 is continually decreased, thereby increasing the rotative speed of the work to maintain a constant cutting speed.

The modification illustrated in Fig. 3 is provided with a variable piston displacement pump 33 driven by a constant speed motor 34. The outlet port 35 of the pump is connected by a conduit 36 to a hydraulic motor 37, said motor being connected by a belt 38 to the lathe chuck 8. The operation of the pump 33 is exactly the reverse of the motor 22 of the embodiment shown in Fig. 2 so that an increase in the volume of oil delivered by the pump increases the speed of the hydraulic motor 37. The piston displacement and the volume will increase with the angle between the axis of symmetry of the cylinders of the pump and the axis of rotation of the drive shaft 39. The shape of the cam 20a on the carriage 21 is therefore such that, as the carriage 12 is fed in and the cutting tool 11 works on a smaller diameter, the cam depresses the plunger 17 and thereby increases the angle between the axis of the cylinders of the pump 33 and the axis of rotation of the shaft 39. This increases the volume of oil delivered by the pump thereby increasing the speed of the hydraulic motor 37. The speed of the work is therefore increased by an amount sufficient to maintain a constant cutting speed between the tool 11 and the work 9.

In the embodiment shown in Fig. 4 the plunger 17, which is actuated by the cam 20 on the carriage 12, is pivotally connected to an arm 40 which actuates a throttle valve 41 in the combined constant flow and relief valve 42, the operation of which is explained in detail in my application, Serial No. 731,470. The constant speed motor 43 drives a constant delivery pump 44 which furnishes oil under pressure to a fixed displacement hydraulic motor 45. The motor 45 drives the chuck 8 through belts 46. The flow control valve 42 is so designed that at a given setting of the throttle 41 the volume of oil delivered to the hydraulic motor 45 through lines 47, 48, and 49 is constant. Any excess oil from the pump 44 is bypassed through a port 50 and a line 51 to the tank, due to the action of a balanced spring resisted piston 52. A control valve 53 is placed in the circuit for the purpose of reversing or stopping the motor 45.

With the control valve in the position shown in Fig. 4, oil under pressure will be delivered to the motor 45 at a constant rate of flow through the line 47, throttle valve 41 and lines 48 and 49. The motor 45 will exhaust through a port 54 and lines 55 and 56. As the motor drives the chuck 8 and the work 9, the carriage 12 will feed toward the work and the movement of the cam 20 will allow the plunger 17 and the valve arm 40 to rise, thereby opening the throttle valve 41. Thus a larger volume of pump delivery will be directed to the hydraulic motor 45 and the motor will increase in speed by an amount sufficient to maintain a constant cutting speed between the tool 11 and the work 9.

The acceleration-deceleration control means which, according to the invention, may be combined with the above described machine tool speed control systems, particularly as shown in Fig. 2, is illustrated in Fig. 5. The combined system consists generally of a constant delivery pump 57, an overload relief valve 58, a valve housing 59, a variable speed motor 60, having a movable cylinder block 61, and a lathe chuck 8. A tool slide 12 is provided with a cam portion 20, as before described, and with the tool holder 10 and the tool 11. The movable part 61 of the motor 60 is connected to the rod 17, and the top portion of which slides on the cam 20 such that movement of the tool slide 12 in and out changes the piston displacement of the cylinder block 61 as previously described. A slidable valve piston 62, having a central axially extending recess 62a, is located in a cylindrical recess 63 in the valve housing 59, and the valve housing 59 also contains relief valves 64, 65 and 66, each having slidable spring pressed valve pistons 67, 68 and 69 respectively. Pipes 70 and 71 connect the valve housing 59 with the pump 57 and the tank 72 respectively. The inlet and outlet ports of the cylinder block 61 are connected to the valve housing by conduits 73 and 74. The valve housing 59 is provided with inner channels the arrangement of which can best be described in connection with the operation of the entire system.

When the valve spool 62 is shifted upwardly from the stop position shown in Fig. 5 to "forward" position, liquid under pressure is directed from the pump 57 through the pipe 70 to channels 75, 76, valve recess 77, across the valve piston 62 to valve recess 78. Channels 79 and 80 then direct the pressure fluid to the motor 60. The motor 60 is driven by this liquid under pressure and the exhaust liquid from the motor passes to the tank through pipe 73, channels 81, 82, valve recess 83, through the axial recess 62a in the valve piston 62 and thence through the valve recess 84 and the channel 85 to the pipe 71 leading to the tank. The pressure channel 75 is connected to the relief valve piston 67 by a channel 86 and valve recess 87. The relief valve 64 is adjustable, the piston 67 being backed by a spring, the tension of which can be changed at will. It will be seen that the acceleration of the motor 60 can be directly regulated by the relief valve 64 since the pressure acting on the motor is at all times subject to the setting of the relief valve. If the pressure in the circuit builds up beyond the setting of the relief valve 64, the liquid under pressure in the channel 75 will by-pass to the tank through the channel 86, valve recess 87 and the channel 85.

The speed of the variable speed motor 60 is regulated by the movement of the tool slide 12 as described in connection with Fig. 2, the speed increasing with the movement of the tool slide toward the center of the rotating work. A second or slow speed of the motor can be obtained by shifting the control valve piston 62 downward slightly from the "forward" position to "slow speed" position.

Liquid under pressure is then directed from the valve recess 77 to the variable speed motor 60 through channels 88 and 89 and a needle valve 90, valve chamber 91, valve recess 78 and then through channels 79 and 80. The exhaust flow from the motor is the same as described above with the valve piston in "forward" position. It will be understood that the slow speed of the variable motor 60 may be regulated by the needle valve 90 and in case the pressure in the system, during the slow speed portion of the cycle becomes greater than that for which the relief valve 64 is set, pressure liquid will be bypassed from the channel 75 through the valve 64 to the tank channel 85.

When the valve piston 62 is shifted to the "stop" position, as shown in Fig. 5, after having been in the "forward" or "slow" speed position, liquid under pressure is directed from the pump 57 to the tank through pipe 70, channels 75, 76, valve recess 77, the axial recess 62a in the valve piston 62, recesses 84 and 92, channels 85 and 93, and the tank pipe 71. Pressure created in the pipe 73 and the lines 81 and 82 by reason of the momentum of the machine is directed through valve recess 83 and channel 94 to a valve recess 95 surrounding the piston 68 of the relief valve 65. Upon overcoming the adjustable spring backing the piston 68, pressure fluid will flow through channels 96 and 88, valve recess 77, central recess 62a in the valve 62, valve recesses 84 and 92 and lines 85 and 93 to the tank. In this manner the motor 60 comes to a stop decelerating at a rate depending on the setting of the relief valve 65, and the liquid pumped out of the line 74 is replenished from the tank through line 85 and check valve 97. During this time the pump 57 is connected to the tank through the axial recess 62a and the channels 85 and 93.

When the valve spool 62 is shifted downward to the "reverse" position, liquid under pressure is directed from the pump through pipe 70, channels 75, 76, valve recess 77, across the valve spool 62 to valve recess 83, and through lines 82 and 81 to the variable speed motor 60. The exhaust liquid from the motor passes to the tank through the pipe 74, the channels 80 and 79, the valve recess 78, through the central recess 62a in the valve piston 62, the valve recess 92, and the channel 93.

When stopping the motor after the valve spool 62 has been shifted from "reverse" position to "stop" position, liquid is directed from pump 57 to the tank through pipe 70, the channels 75 and 76, valve recess 77 and axial recess 62a, valve recesses 84 and 92 and lines 85 and 93. Pressure created in lines 74, 80 and 79 by the momentum of the variable speed motor 60 and machine tool, is directed through valve recess 78 and channel 98 to the valve recess 99 surrounding the piston 69 of the adjustable relief valve 66. When the pressure is sufficient to overcome the spring behind the valve piston 69 it is then directed through the channel 100 to the channel 88 and thence to the tank via valve recesses 77 and 62a and channels 85 and 93. In this manner the motor 60 comes to a stop, decelerating at a rate depending on the setting of relief valve 66. The oil pumped from line 81 is replenished from the tank through line 93 and check valve 101.

It will thus be seen that the relief valves 64, 65, and 66 permit an independent regulation of the limiting pressure effecting acceleration and deceleration of the fluid motor. The valves 65 and 66 are ineffective during the time the motor is running at its normal speed in one direction or the other since it will be noted that, during such period, both the inlet and discharge of the relief valve in the supply circuit are subjected to pressure. For example, during "forward" rotation channels 98 and 100, the inlet and discharge channels, respectively, of relief valve 66, are both connected to pressure since they are in communication with ports 77 and 78 of valve 62 through which liquid under pressure is passing to the motor 60. It will be seen that with the control means disclosed in Fig. 5, the cutting speed may not only be maintained at a constant rate by reason of the interaction of the movable cylinder block 61 and the cam 20, but also there will be no need for a clutch device for the starting and stopping of the machine tool. Also with the "slow" speed it is possible to change gears in case any back gears are provided on the machine being driven.

The principle of the invention has been explained with reference to a lathe and sliding tool holder though it may be easily adapted to any type of machine tool which has rotating work or a rotating tool and which effects a change in diameter as the work is cut away. It will be seen that the invention would be equally applicable where the tool cuts outwardly from the center of the article being machined.

We claim:

1. In a machine tool, a pressure source, a variable piston displacement motor connected to said pressure source comprising a driving shaft and a cylinder head universally connected thereto, the speed of said driving shaft being inversely proportioned to the angle between the central axes of said cylinder head and said driving shaft, a rotatable means, driven by said motor, for holding an article to be machined, a tool carriage, and means operatively connecting said carriage and said cylinder head whereby movement of said tool carriage as it is fed toward the axis of an article being machined will increase the speed of said motor and maintain a constant cutting speed.

2. In a machine tool, a constant speed power source, a variable piston displacement pump to be driven by said motor, comprising a driven shaft and a cylinder head universally connected thereto, the volume output of said pump being directly proportional to the angle between the axes of said driven shaft and said cylinder head, a hydraulic motor driven by the output of said pump, a rotatable means driven by said motor for holding and driving an article to be machined, a cross-feed tool carriage, and means operatively connecting said carriage and said cylinder head whereby movement of said carriage as it is fed toward an article being machined will automatically increase said angle and the output of said pump and the speed of said motor to maintain a constant cutting speed.

3. In a machine tool, a rotatable means for holding an article to be machined, a hydraulic motor for driving said holding means, a pressure source connected to said motor, a hydraulic flow control adjustable throttle valve for controlling the speed of said motor, a cross-feed tool carriage and operatively connecting said carriage and said adjustable throttle valve whereby the speed of the motor will have a predetermined relation to the movement of said carriage to effect a constant cutting speed at the surface of said article to be machined.

4. In a machine tool, a rotatable means for holding an article to be machined, a hydraulic motor for driving said holding means, a pressure source connected to said motor, a hydraulic flow control adjustable throttle valve for controlling the speed of said motor, a cross-feed tool carriage, cam means on said carriage, and means operatively connecting said cam means and said throttle valve such that movement of said carriage toward the article being machined will open said throttle valve and increase the speed of said motor whereby a constant cutting speed may be mainttained between a tool and an article being machined.

5. In a machine tool of the type having power driven rotating work, means for holding the rotating work, variable speed hydraulic power means for driving said first named means, movable means for varying the speed of said power means, a cross-feed tool carriage member, cam means on said carriage member, means operatively connecting said movable means and said cam means whereby the speed of the power means is automatically synchronized with the position of the carriage member, and means for limiting the acceleration and deceleration of said hydraulic power means comprising valve means connected to said power means.

6. In a machine tool of the type having power driven rotating work and a cross-feed tool carriage member, hydraulic power means for driving said work, means for synchronizing work speed and carriage feed to obtain a constant cutting speed, comprising speed control means for the power means, and means on the carriage member operatively connected to said speed control means whereby the speed of the power means will bear a predetermined relationship to the position of the tool carriage member, and hydraulic means for controlling the acceleration and deceleration of said hydraulic power means.

7. In a machine tool drive system, a tank, a pressure source, a motor, hydraulic connections between said motor and said pressure source, and relief valve means set to limit the pressures available for controlling acceleration and deceleration of said motor.

8. In a machine tool drive system, a tank, a pressure source, a rotatable part for holding an article to be machined, a motor for driving said part, hydraulic connections between said motor and said pressure source, and a control means for directing pressure to and from said motor comprising a housing provided with valve recesses and interconnecting channels, a directional control valve in one of said recesses adapted to be shifted to direct pressure from said pump to said tank and to said motor, relief valves in said housing, and hydraulic connections to place said valves in series with the pressure flow to and from said motor during acceleration and deceleration of said motor.

9. In a machine tool drive system, a pressure source, a tank, a variable speed motor having inlet and outlet ports, hydraulic connections between said motor and said pump, and a control means for directing and controlling pressure to and from said motor comprising a directional control valve adapted simultaneously to control flow of pressure to and from said motor, a by-pass relief valve subject to pressure flowing to said motor ports and adapted to limit the acceleration pressure available to said motor, and deceleration relief valves having connections with said control valve whereby exhaust flow from said motor is in series with one of said last named relief valves when liquid pressure is cut off from said motor.

10. In a machine tool drive system, a pressure source, a tank, a motor having inlet and outlet ports, a control valve adapted to direct liquid under pressure from said pressure source and to and from said motor a relief valve subject to pressure flowing to said motor and adapted to control the acceleration pressures therein, and relief valves adapted to be placed in series respectively with the exhaust of said motor by movement of said control valve when said motor is decelerating to control the exhaust flow and deceleration.

KENNETH R. HERMAN.
HARRY F. VICKERS.